(12) United States Patent
Span

(10) Patent No.: US 8,365,523 B2
(45) Date of Patent: Feb. 5, 2013

(54) HYDRAULIC ASSEMBLY FOR DRIVING AND CONTROLLING SMALL HYDRAULIC UNITS

(75) Inventor: Iztok Span, Ljubljana (SI)

(73) Assignee: Tajfun Planina Proizvodnja Strojev, D.O.O., Planina pri Sevnici (SI)

(*) Notice: Subject to any disclaimer, the term of this patent is extended or adjusted under 35 U.S.C. 154(b) by 938 days.

(21) Appl. No.: 12/442,551

(22) PCT Filed: Dec. 27, 2006

(86) PCT No.: PCT/SI2006/000038
§ 371 (c)(1),
(2), (4) Date: May 13, 2009

(87) PCT Pub. No.: WO2008/039158
PCT Pub. Date: Apr. 3, 2008

(65) Prior Publication Data
US 2009/0313986 A1    Dec. 24, 2009

(30) Foreign Application Priority Data
Sep. 27, 2006  (SI) ................ P-200600225

(51) Int. Cl.
*F15B 1/02*    (2006.01)
*F16D 67/04*   (2006.01)

(52) U.S. Cl. .............. 60/421; 60/413; 91/518

(58) Field of Classification Search ......... 60/413, 60/420, 421; 91/518
See application file for complete search history.

(56) References Cited

U.S. PATENT DOCUMENTS

| | | | | |
|---|---|---|---|---|
| 4,004,779 A * | 1/1977 | Flesburg | .................. | 91/536 |
| 4,309,152 A * | 1/1982 | Hagen | .................. | 417/218 |
| 4,441,865 A * | 4/1984 | Staisch | .................. | 417/319 |
| 4,553,298 A * | 11/1985 | Grable | .................. | 29/888.02 |
| 4,830,589 A * | 5/1989 | Pareja | .................. | 92/13.7 |
| 4,875,337 A | 10/1989 | Sugiyama et al. | | |
| 5,626,466 A * | 5/1997 | Ruoff et al. | .................. | 417/273 |
| 6,422,212 B1 * | 7/2002 | Faix et al. | .................. | 123/506 |
| 6,622,706 B2 * | 9/2003 | Breeden | .................. | 417/273 |

FOREIGN PATENT DOCUMENTS

| | | |
|---|---|---|
| DE | 3004067 A1 | 8/1981 |
| DE | 3234182 A1 | 3/1984 |
| EP | 0349067 A1 | 1/1990 |
| FR | 2116693 A5 | 7/1972 |
| JP | 58121306 A | 7/1983 |
| JP | 60263710 A | 12/1985 |
| JP | 63083405 A | 4/1988 |
| JP | 2001080391 A | 3/2001 |
| JP | 2004176698 A | 6/2004 |
| JP | 2004360300 | 12/2004 |

OTHER PUBLICATIONS

International Preliminary Report on Patentability mailed on Dec. 29, 2008 in PCT/SI2006/000038. International Search Report mailed on Jun. 6, 2007 in PCT/SI2006/000038.
Written Opinion mailed on Jun. 6, 2007 in PCT/SI2006/000038.

* cited by examiner

*Primary Examiner* — Thomas E Lazo
(74) *Attorney, Agent, or Firm* — Stanislav Antolin

(57) ABSTRACT

A hydraulic assembly for driving and controlling small hydraulic units, such as hydraulic cylinders of a brake and/or clutch of a forestry winch, is disclosed. The hydraulic assembly includes a means for establishing and also maintaining a pre-determined pressure of a hydraulic media. The hydraulic assembly is characterized by as low as possible hydraulic loss. Also, a quantity of hydraulic media required for a regular operation and maintaining the pressure within the hydraulic assembly is as low as possible.

13 Claims, 3 Drawing Sheets

HYDRAULIC ASSEMBLY FOR DRIVING AND CONTROLLING SMALL HYDRAULIC UNITS

This application is a national stage application under 35 U.S.C. 371 of international application No. PCT/SI2006/000038 filed 27 Dec. 2006, and claims priority to Slovenian Application No. P-200600225 filed 27 Sep. 2006, the disclosures of which are expressly incorporated herein by reference.

BACKGROUND

The invention refers to mechanical engineering, namely to fluid pressure actuators and hydraulics, namely to fluid-pressure actuators. On the other hand the invention may also belong to performing operations, in particular to hydraulic control devices for rope or chain winding mechanisms of winches.

The purpose of the invention is to create a hydraulic assembly, which would enable driving and controlling of small hydraulic units, in particular hydraulic cylinders for controlling of brake and clutch of a forestry winch, with means to establish and also to maintain a pre-determined pressure of a hydraulic media within the hydraulic circuit, wherein at the same time the hydraulic loss should be as low as possible and the quantity of said hydraulic media required for regular operation and maintaining the pressure within the assembly should also be as low as possible.

As known to those skilled in the art, hydraulic assemblies are used also for the purposes of controlling and driving in the field of forestry winches. A winding drum is driven by means of the internal combustion engine of the belonging tractor via appropriate shaft and a chain reduction gear, and includes a clutch and a brake, which operate alternatively. When the brake is deactivated, the clutch is activated, which then enables turning and driving of a winding drum, upon which by deactivation of said clutch the brake is automatically activated in order to prevent said drum from any further turning. Controlling of said clutch and brake may commonly also be performed by means of electric or any other control units, which is however not always feasible or is much more complicated, when the winch is used in situ, where relevant energy sources are limited or not available at all. Since appropriate hydraulic assembly may no doubt be surmounted to such winch, the pump of which may easily be driven by means of each disposable tractor engine, such appliances for controlling of clutch and brake have already been realized also in the practical use. Appropriate hydraulic circuit comprises a pump, which charges the hydraulic media via appropriately arranged valves and depending on position and adjustment thereof either towards the brake controlling cylinder or a clutch controlling cylinder, by which the residual hydraulic media is then returned back to reservoir i.e. towards said pump. As known to the applicant, a geared pump has exclusively been used for such purposes. Such assembly may no doubt establish a required pressure of the hydraulic media within the hydraulic circuit, but the pump must be able to ensure a sufficient quantity of the media in a required time for the purposes of supplying each cylinder and in order to enable sufficiently short shifting time of control units of the clutch and brake, so that the pumping capacity must be relatively high. Accordingly, the pump must assure sufficiently high capacity all the time, by which the hydraulic loss due to leakage is relatively high, which then in correlation with high pressure results in heating or even overheating of the hydraulic system, which has essential impact to decreasing of quality of hydraulic media and wearing of sealing members, by which the risk of disturbances or damages during operation is then essentially increased. In addition to that, such assembly is pretty bulky when bearing in mind its overall dimensions, not only due to complex and bulky valves included therein, but also due to huge quantity of the hydraulic media and bulky reservoir for storage thereof. It is also obvious, that a hydraulic assembly containing such quantity of hydraulic fluid is not an environment-friendly one, especially when bearing in mind, that said damages may occur during operation in situ, e.g. in the forest or the like.

Various hydraulic circuits are described also in the patent literature, e.g. in FR 2.116.693, JP 58121306A, JP 60263710, JP63083405A, JP 2004176698 or JP 2004360300A, which belong to various devices and are all very complicated and include numerous components, so that the applicant is of opinion, that none of them solves the previously mentioned technical problem, which is however solved by the proposed invention.

A hydraulic assembly for driving and controlling of small hydraulic units, especially of gearbox clutch is described in DE 30 04 067 A1. Such assembly should comprise a reservoir for hydraulic media, a pump intended for producing a required pressure of hydraulic media, as well as a control unit consisting of at least one control valve and at least one hydraulic cylinder. A hydraulic circuit of the hydraulic assembly should include a piston pump, which is at the one hand connected with said control unit and reservoir via a non-return valve, which allows flowing in a direction away from the pump and not in the opposite direction, and on the other hand either via a switching valve with integrated non-return valve, which allows flowing towards the pump but not also in the opposite direction, in a serial manner into a hydraulic circuit together with a pressure storage tank and the non-return valve, or by exceeding a pre-defined pressure by means of automatically shifting of the switching value into a hydraulic circuit, which includes said pump, a switching valve, a control unit and said non-return valve, which are hydraulically interconnected in a serial manner. Such an assembly should enable generating servomechanism power in a sufficient quantity to control all available controlled units.

SUMMARY

The present invention refers to a hydraulic assembly for driving and controlling of small hydraulic units, especially of brake and clutch cylinders of a forestry winch, wherein such assembly comprises at least a reservoir for hydraulic media, a pump intended for producing a required pressure of hydraulic media, as well as a control unit, which consists of at least one control valve as well as of at least one hydraulic cylinder.

According to the invention, a hydraulic circuit of the hydraulic assembly includes a piston pump, which is at the one hand via a non-return valve, which allows flowing in a direction away from the pump but not also towards said pump, hydraulically connected with a control unit and a reservoir of said hydraulic media, and on the other hand either via a switching valve with integrated non-return valve, which allows flowing towards the pump but not also in the opposite direction, in a serial manner into a hydraulic circuit together with a pressure storage tank and the non-return valve, or by exceeding a pre-defined pressure by means of automatically shifting of the switching valve into a hydraulic circuit, which includes said pump, a switching valve, a control unit and said non-return valve, which are hydraulically interconnected in a serial manner.

Said piston pump consists of a housing, in which a crankshaft is mounted on a belonging eccenter link and is by means of appropriate bolt pivotably connected with a piston, which is equipped with a sealing member and a wiper and inserted within a cylinder, which is integrated within said housing and equipped with appropriate hydraulic connector adapted for charging the hydraulic media into the area adjacent to the front surface of said piston or also for discharging said media there-from. Said eccenter link is preferably mechanically interconnected with a corresponding shaft of a reduction gear of the winch.

The switching valve comprises a non-return valve, which is mounted within a housing of the switching valve and allows flowing towards the pump but not also in the opposite direction, as well as a needle, which is pressed towards said non-return valve by means of a spring, which is supported by an adjusting member screwed into the housing, by which said switching valve is also equipped with three hydraulic connectors for charging the hydraulic media into the switching valve or discharging said media therefrom. The first hydraulic connector is foreseen adjacent to the non-return valve and allows hydraulic media to flow outwards from the housing of the switching valve. The second hydraulic connector of the valve is placed within the area of a normal position of the needle, when pressed towards the non-return valve by means of said spring. The third hydraulic connector of the valve is placed in the area corresponding to position of the needle when shifted away from the non-return valve opposite to the reaction force of the spring. Said spring is preferably a compression helical spring. Furthermore, said switching valve is hydraulically connected in the area of its first hydraulic connector with the pump and at the same time via the non-return valve both with the control unit and also with the pressure storage tank, which is at the same time hydraulically interconnected with the third hydraulic connector of the switching valve. Still further, said switching valve is hydraulically interconnected in the area of its second hydraulic connector with a reservoir of the hydraulic media and at the same time also with the control unit, while the interconnection between said second connector and the pump and/or the first connector is disabled by means of the non-return valve.

Such assembly preferably comprises at least one pressure gauge, which is incorporated within the hydraulic circuit between the pressure storage tank and the third hydraulic connector of the switching valve.

The control unit consists of a control valve as well as of at least one control cylinder, which may be via said control valve integrated into the hydraulic circuit, in which the piston pump is integrated either directly or indirectly via the pressure storage tank. In a preferred embodiment and use of the invention such hydraulic assembly includes a control unit, which consists of parallel interconnected cylinder adapted to control a brake of a forestry winch and cylinder adapted to control a clutch of a forestry winch, which are both via the control valve connected with the hydraulic circuit, in which the piston pump is included either directly or indirectly via the pressure storage tank.

The control valve as such is either electrically or mechanically controlled 4/3 valve, namely a valve with four hydraulic connectors and three operational positions.

BRIEF DESCRIPTION OF THE DRAWINGS

The invention will be described in more detail on the basis of an embodiment, which is shown in the enclosed drawing, wherein FIG. 1 an embodiment of the assembly for controlling and driving of small hydraulic units according to the invention, which is intended for controlling of brake and clutch of a forestry winch and is shown in its mounted state on the gearbox of the forestry winch during its exploitation.

DETAILED DESCRIPTION OF THE INVENTION

Figure 1:
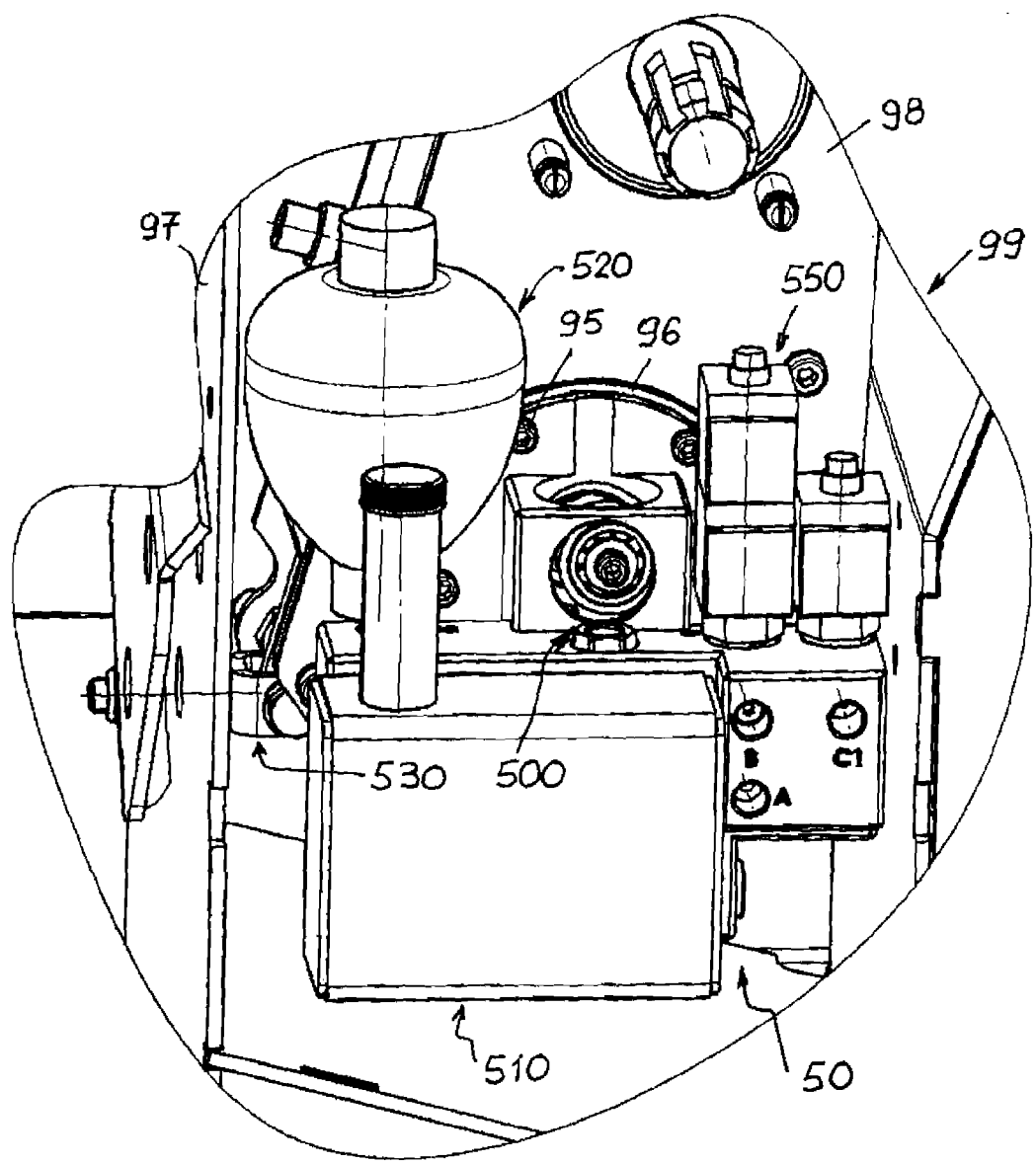

Hydraulic assembly 50 according to the invention, which is shown in FIG. 1, is adapted for being mounted directly to a housing 97 of a forestry winch 99 and is in this particular embodiment attached to a chain transmission i.e. a reduction gear 98 by means of a flange 96 and screws 95, wherein such simple and practical concept results in extremely small overall dimensions of the assembly regardless to the fact, that the pressure achieved therein may be greater than 100 bar by the flow rate 2 l/min and the pump velocity 540 min$^{-1}$.

Figure 2:
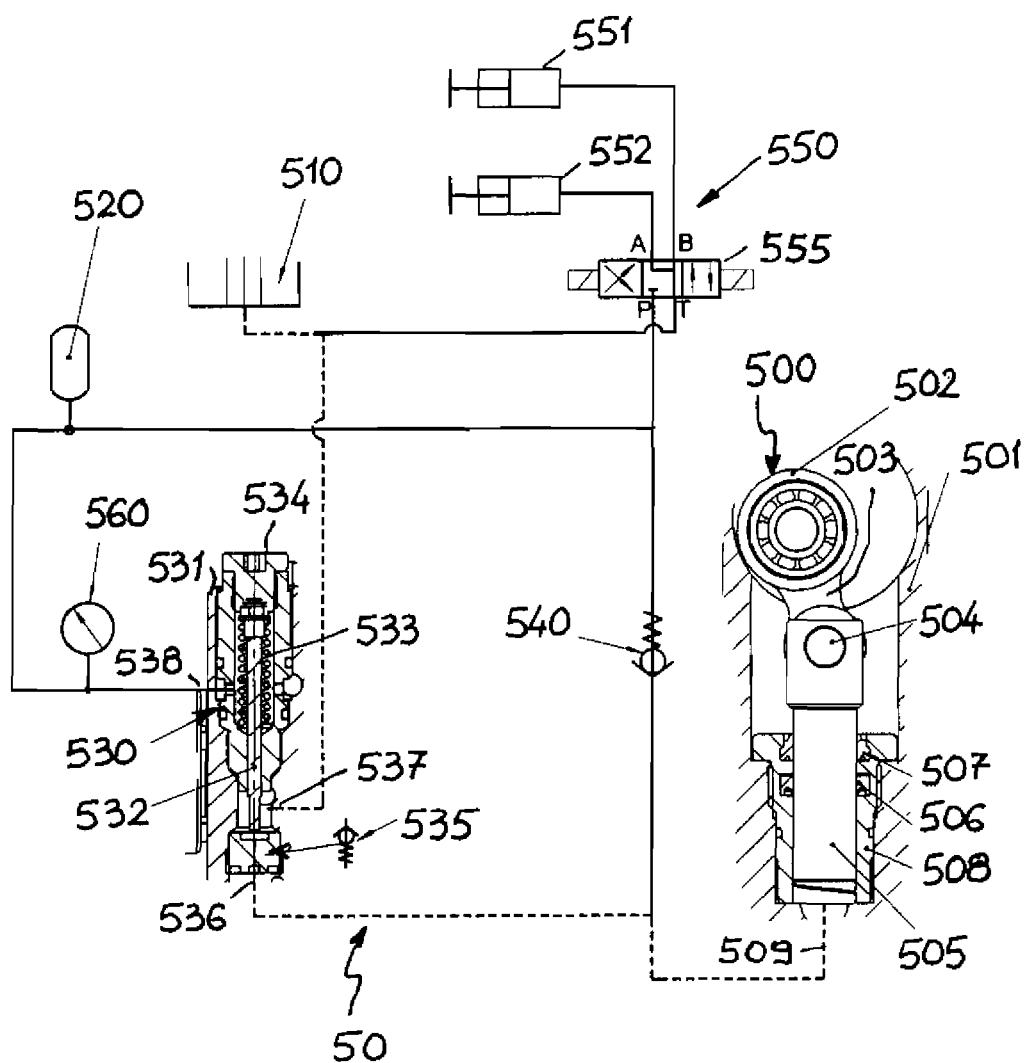
FIG. 2 a schematically shown hydraulic circuit during the suction operating mode of the pump.
Figure 3:
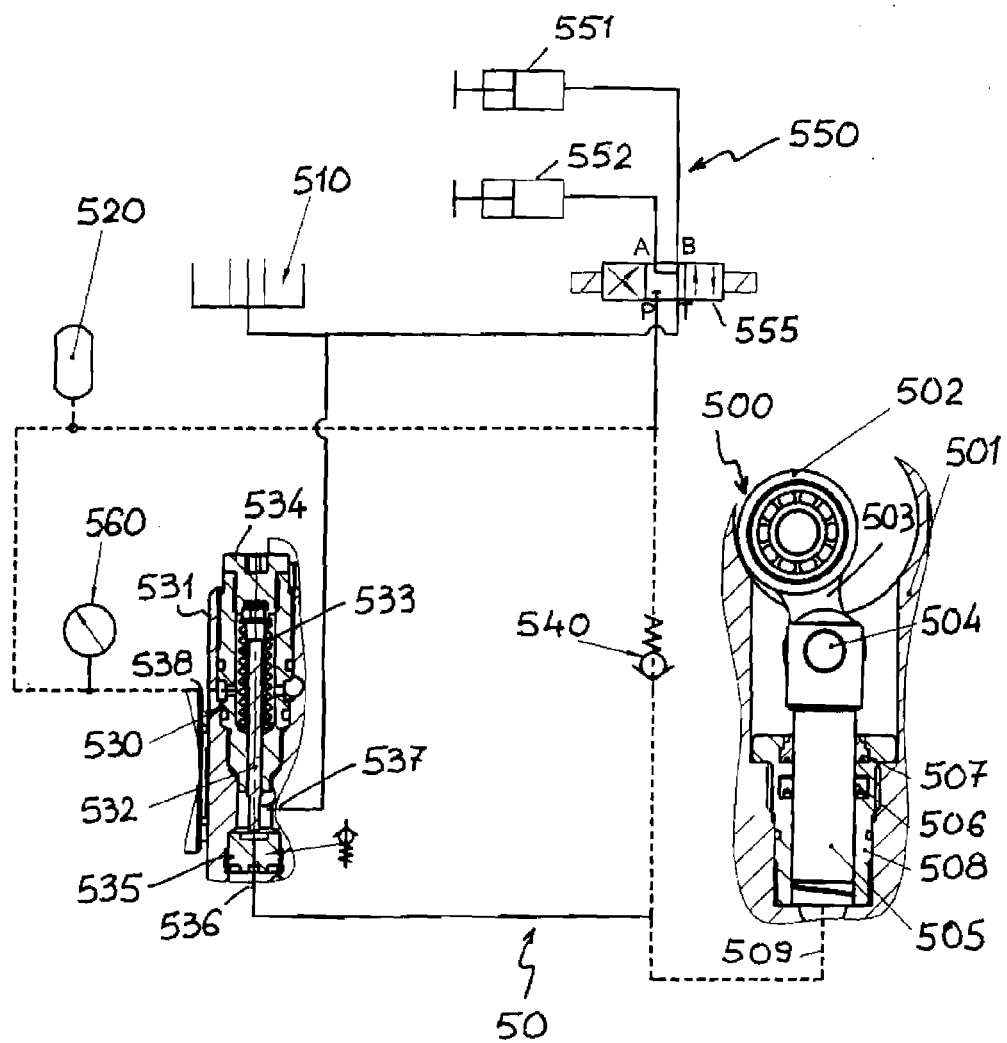
FIG. 3 a schematically shown hydraulic circuit during the compression operating mode of the pump.

As evident in FIG. 1 and also in FIGS. 2 and 3, such hydraulic assembly 50 according to the invention comprises a piston pump 500, a reservoir 510 for hydraulic media, a pressure storage tank 520, a switching valve 530 together with a non-return valve 535, a non-return valve 540 as well as a control unit 550, and optionally also a pressure measuring unit i.e. a pressure gauge 560. Said parts are interconnected in a manner, which will be explained in more detail in the further description.

The piston pump 500 consists of a casing 501, in which a piston rod 503 is mounted on an eccenter link 502, which is connected with a shaft (not shown) of the reduction gear 98 of the winch 99, while said crankshaft 503 is then by means of appropriate bolt 504 in a connected pivotable manner with a piston 505, which is equipped with a sealing member 506 and a washer 507 and inserted into a cylinder 508, which normally forms a part of said casing 501 and includes appropriate hydraulic connector 509, through which the hydraulic media is then charged into said cylinder 508 in the area adjacent to the front surface of said piston 505 or may also be discharged therefrom.

The piston pump 500 is by means of said connector 509 hydraulically connected on the one hand via said non-return valve 540, which prevents the flow towards the pump 500 and allows the flow in opposite direction, and also with the reservoir 510 and the control unit 550, and on the other hand with the switching valve 530 via the non-return valve 535 thereof, which allows the hydraulic media to flow towards the pump 500 but not also in the opposite direction.

The switching valve 530 comprises said non-return valve 535, which is mounted within the housing 531 of said switching valve 535, as well as a needle 532, which is pressed towards said non-return valve 535 by means of a spring 533, preferably a compression helical spring, wherein said spring 533 is supported by an adjusting member 534, which is e.g. screwed into the housing 531. Said switching valve 530 is equipped with three hydraulic connectors 536, 537, 538 for charging/discharging of hydraulic media into/from the valve 530. The first hydraulic connector 536 is foreseen in the area of said non-return valve 535 and permits exclusively discharging of hydraulic media outwards from the housing 531 of the valve 530. The second hydraulic connection 537 of the switching valve 530 is foreseen in the area of normal position of the needle 532, in which said needle is pressed towards the non-return valve 535 by means of said spring 533. The third hydraulic connector 538 of the switching valve 530 is available in the area, into which the needle 532 is moved from the aforementioned position due to compression of said spring 532, namely apart from the non-return valve 535.

Thanks to its first hydraulic connector 536 the switching valve 530 is hydraulically connected with the pump 500 and at the same time by means of non-return valve 540 with the control unit 550 as well as with the pressure storage tank 520, which is at the same time hydraulically connected with the third hydraulic connector 538 of the switching valve 530. Still further, thanks to its second hydraulic connection 537 the switching valve 530 is hydraulically connected with the reservoir 510 of hydraulic media and at the same time also with the control unit 550, while the connection between said connector 537 and the pump 500 and/or the first connector 536 is disabled by means of a non-return valve 540.

In this particular embodiment the assembly 50 is furthermore equipped with a pressure gauge 560, which is included within the hydraulic circuit between the pressure storage tank 520 and the switching valve 530, namely the third connector 538 thereof.

Operation of the assembly 50 within the range of previously described pressure and flow capacity of the hydraulic media should normally be feasible, if a standard G ¼" valve is used as a non-return valve 540, and if the non-return valve 535 within the switch valve 530 is a standard G ⅜" valve.

In this embodiment the control unit 550 consists of a brake control cylinder 551 and a clutch control cylinder 552, which are connected with relevant components of the hydraulic assembly 50 by means of appropriate control valve 555, which is in FIGS. 2 and 3 presented like a ⅘ valve i.e. a valve with four connections and three operational options resulting from position thereof.

The piston pump 500 of said hydraulic assembly 50 may either operate in a suction operational mode or in compression operational mode or simply in a mode, in which a pre-determined pressure within a hydraulic circuit is maintained at a desired level.

Operation of said pump 500 is presented in FIG. 2 by means of a dotted line. The pressure in the cylinder 508 is reduced by means of said piston 505, by which the non-return valve 535 in the switching valve 530 is shifted into opened state, which then results in suction of the hydraulic media from the reservoir 510 throughout the second connector 537 of the switching valve 530 towards the pump 500.

Operation in the compression mode is shown in FIG. 3, where the flowing direction of the hydraulic media is presented by means of a dotted line. The hydraulic media is compressed within said cylinder 508 by means of the piston 508, which is then entering into said tank 520 via the non-return valve 540. As soon as a pre-determined value of the pressure, which is preset by means of the adjusting member 534 i.e. by compression of the spring 533 within the switching valve 530 e.g. to approx. 100 bar, is achieved within the system, then the valve 530 is automatically actuated/shifted, by which the needle 532 is moved towards the adjusting member 534 i.e. away from the non-return valve 535 and opposite to compression force resulting from said spring 533.

When a pre-determined pressure is achieved within the hydraulic circuit, the control valve 555 may be shifted to and fro either mechanically or by means of electric or any other means, by which the hydraulic media is then appropriately directed into a desired cylinder 551, 552 or discharged therefrom, respectively. If none of cylinders 551, 552 is actuated, the non-return valve 535 of the switching valve 530 is held in its opened position due to the pressure within the systems, by which the hydraulic media is flowing in the same direction as in the aforementioned suction mode according to FIG. 2. In such a mode the pump is still performing its oscillatory movement, so that also the level of the hydraulic media is permanently oscillating, which however has no practical influence with respect to operation of the hydraulic assembly as such. When desired, such oscillating may also be essentially reduced by means of a simple measure, namely by using some thicker hydraulic conduits. On the other hand, there is no leakage within the hydraulic system, and in particular no heating or overheating, which would lead to destruction or decomposition of the hydraulic media and herewith to decreasing of functional characteristics thereof, which would normally result in increasing of risk of damages or disturbances during operation of components of the hydraulic assembly 50.

Exclusively for the purposes of illustration of benefits, which obviously result from such a concept, it should be annotated, that such hydraulic assembly is extremely useful for the purposes of controlling of a clutch cylinder 551 and a brake cylinder 552 of a forestry winch 99, by which the pressure within the hydraulic assembly 50 is normally about 100 bar, and the pump 500 having a capacity of approx. 2 l of the hydraulic media per minute is driven by means of a shaft, which is turned by 540 $min^{-1}$, by which the complete quantity of the hydraulic media, which is required for regular operation, should normally not exceed 0.5 l. All these characteristics of the proposed invention consequently result in a solution, which is by taking into account essentially minimized dimensions, number of components and quantity of the hydraulic media, extremely useful not only in the field of forestry winches, but also in the field of controlling any other devices by means of relatively small hydraulic components.

The invention claimed is:

1. A hydraulic assembly of a hydraulic unit comprising:
a hydraulic media reservoir;
a piston pump, wherein said piston pump comprises a piston pivotably connected to a crankshaft; and wherein said crankshaft is mounted on an eccenter link adapted to mechanically interconnected with said hydraulic unit;
a control unit;
a switching valve;
a non-return valve;
a pressure storage tank; and
a hydraulic circuitry;
wherein said hydraulic circuitry is in communication with said hydraulic media reservoir, said piston pump, said control unit, said switching unit, said non-return valve and said pressure storage tank.

2. The hydraulic assembly according to claim 1, wherein said switching valve further comprises
a second non-return valve;
a needle adapted for being pressed towards said second non-return valve;
a first hydraulic connector adjacent to said second non-return valve;
a second hydraulic connector in proximity to said needle when said needle is pressed towards said second non-return valve; and
a third hydraulic connector in proximity to said needle when said needle is not pressed towards said second non-return valve;
wherein said second non-return valve is adapted to allow movement of a hydraulic media through said hydraulic circuitry towards said piston pump and does not allow movement of said hydraulic media through said hydraulic circuitry in the opposite direction.

3. The hydraulic assembly according to claim 2, wherein said switching valve is in communication with:

said piston pump at or around said first hydraulic connector;

said non-return valve in communication with said control unit and said pressure storage tank; and said pressure storage tank at or around said third hydraulic connector.

4. The hydraulic assembly according to claim 2, wherein said switching valve is in communication with said hydraulic media reservoir;

said control unit; and said piston pump;

wherein said hydraulic media reservoir, said control unit, and said piston pump are in communication with said switching valve at or around said second hydraulic connector; and wherein said piston pump is additionally in communication with said switching valve at or around said first hydraulic connection;

wherein the communication between said piston pump and said switching valve at or around said second hydraulic connector is disabled by means of the non-return valve.

5. The hydraulic assembly according to claim 2, further comprising at least one pressure gauge, wherein said at least one pressure gauge is in communication with said hydraulic circuitry between said pressure storage tank and said third hydraulic connector.

6. The hydraulic assembly according to claim 1, wherein said control unit comprises a control valve; and at least one control cylinder; wherein said control valve is in communication with said hydraulic circuitry; and wherein said piston pump is in communication with said pressure storage tank.

7. The hydraulic assembly according to claim 6, wherein said control unit further comprises at least one parallel interconnected cylinder-adapted to control a brake of a forestry winch; and at least one more parallel interconnected cylinder adapted to control a clutch of a forestry winch wherein said at least one parallel interconnected cylinder and said at least one more parallel interconnected cylinder are in communication with said hydraulic circuitry and said piston pump.

8. The hydraulic assembly according to claim 6, wherein said control valve comprises an electrically controlled valve, a mechanically controlled valve or a combination thereof.

9. The hydraulic assembly according to claim 8, wherein said control valve comprises a 4/3 valve.

10. A method of making a piston pump for use in a hydraulic unit comprising:

attaching an eccenter link to a crankshaft; and attaching said crankshaft to a piston of a piston pump;

wherein said eccenter link is adapted to mechanically interconnect with a hydraulic unit; and attaching said piston pump to a hydraulic assembly;

wherein said hydraulic assembly comprises a hydraulic media reservoir;

a piston pump, wherein said piston pump comprises a piston pivotably connected to a crankshaft; and wherein said crankshaft is mounted on a eccenter link adapted to mechanically interconnected with said hydraulic unit;

a control unit;

a switching valve;

a non-return valve;

a pressure storage tank; and a hydraulic circuitry;

wherein said hydraulic circuitry is in communication with said hydraulic media reservoir, said piston pump, said control unit, said switching unit, said non-return valve and said pressure storage tank.

11. The method of claim 10, wherein said control unit comprises a control valve; and at least one control cylinder; wherein said control valve is in communication with said hydraulic circuitry; and wherein said piston pump is in communication with said pressure storage tank.

12. The method of claim 10, further comprising producing pressure within said hydraulic circuitry;

wherein at or below a predetermined pressure, said piston pump, said switching valve, said pressure storage tank, and said non-return valve are in communication in a serial manner; and wherein greater than a predetermined pressure, said piston pump, said switching valve, said control unit, and said non-return valve are in communication in a serial manner.

13. The method of claim 10, wherein said eccenter link is adapted to mechanically interconnect with a gear of said hydraulic unit.

\* \* \* \* \*